Nov. 8, 1938.   L. P. MILLARD   2,135,621
HARVESTER-THRESHER
Filed Aug. 6, 1936   4 Sheets-Sheet 2
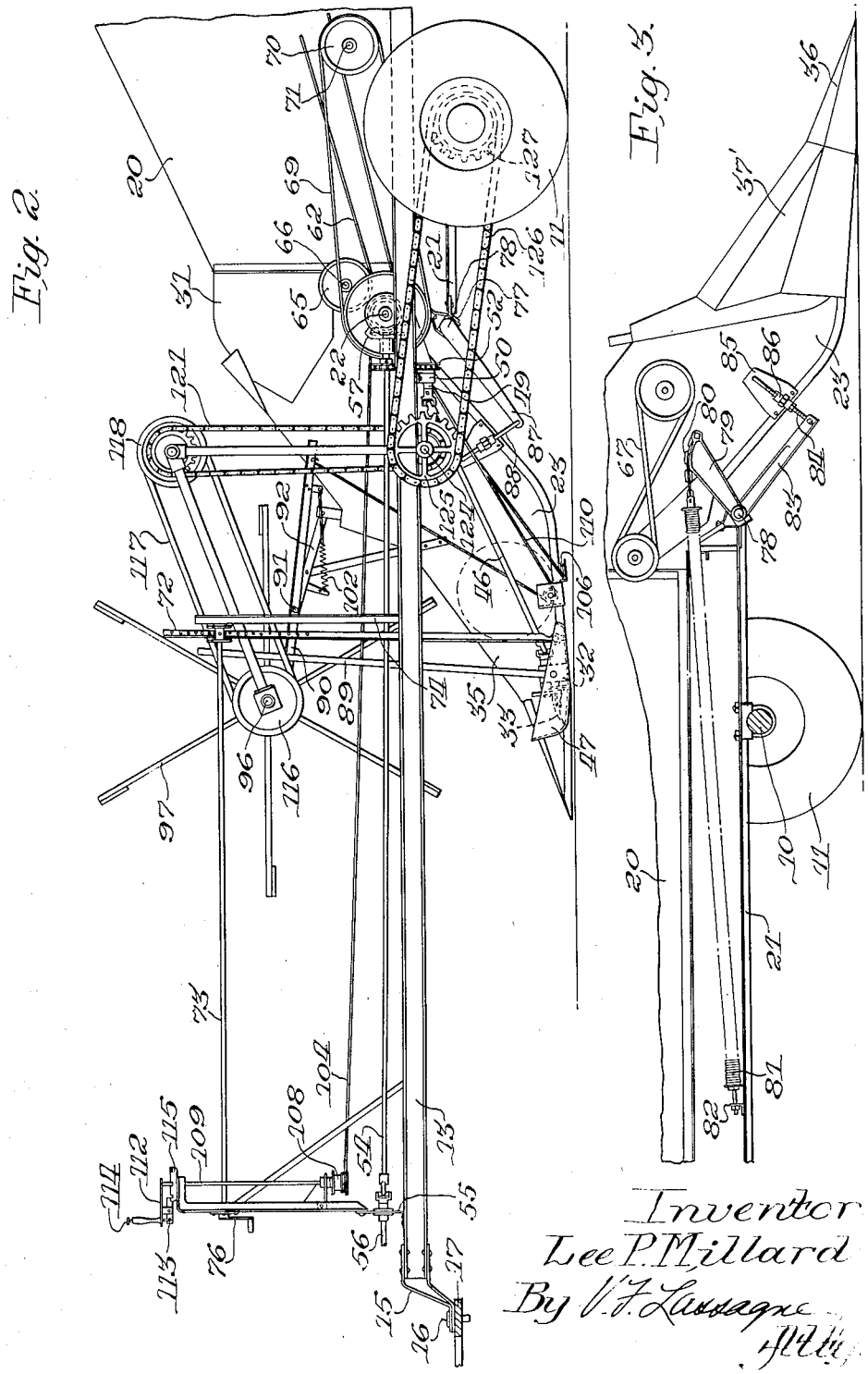
Inventor
Lee P. Millard
By V. F. Lassagne
Atty

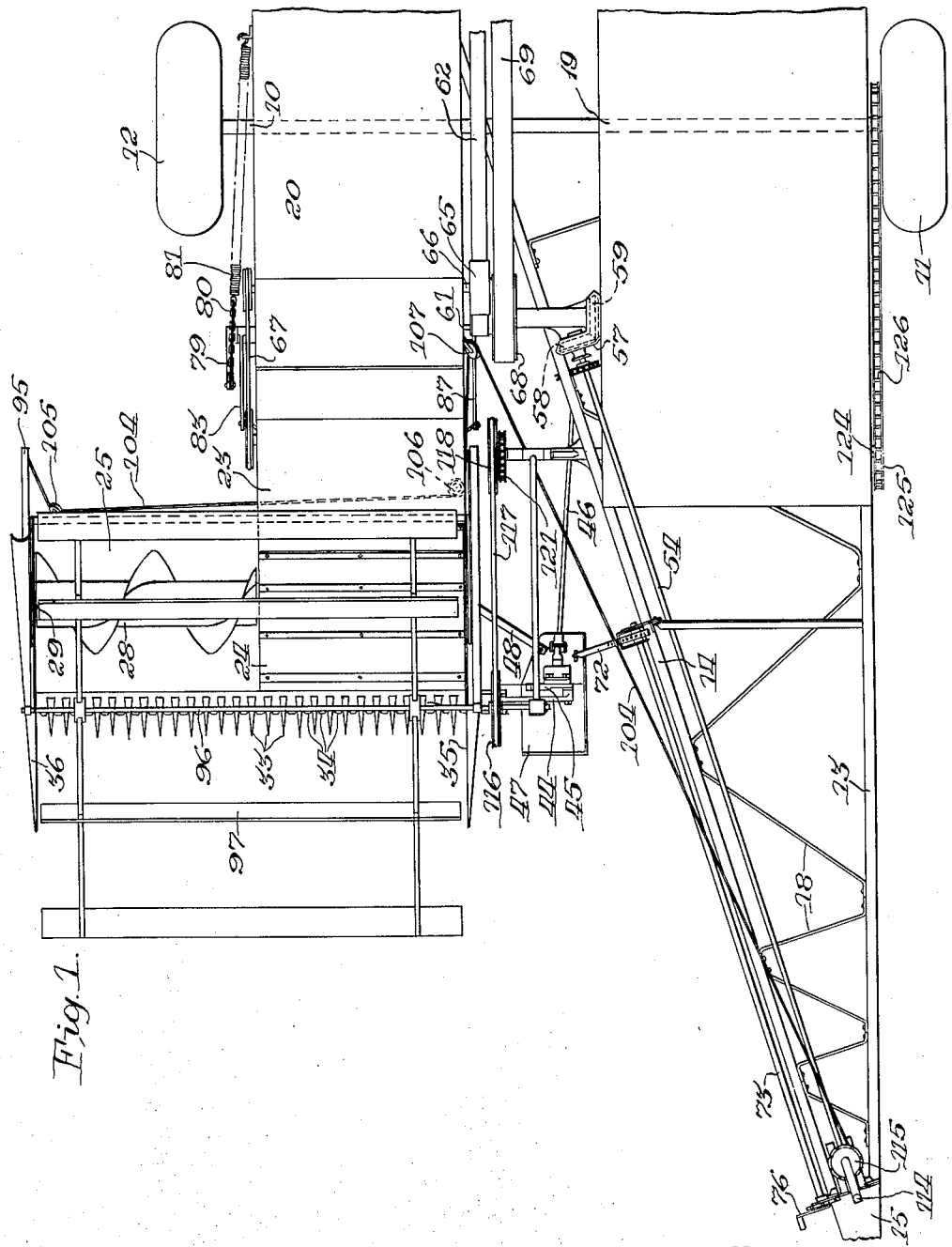

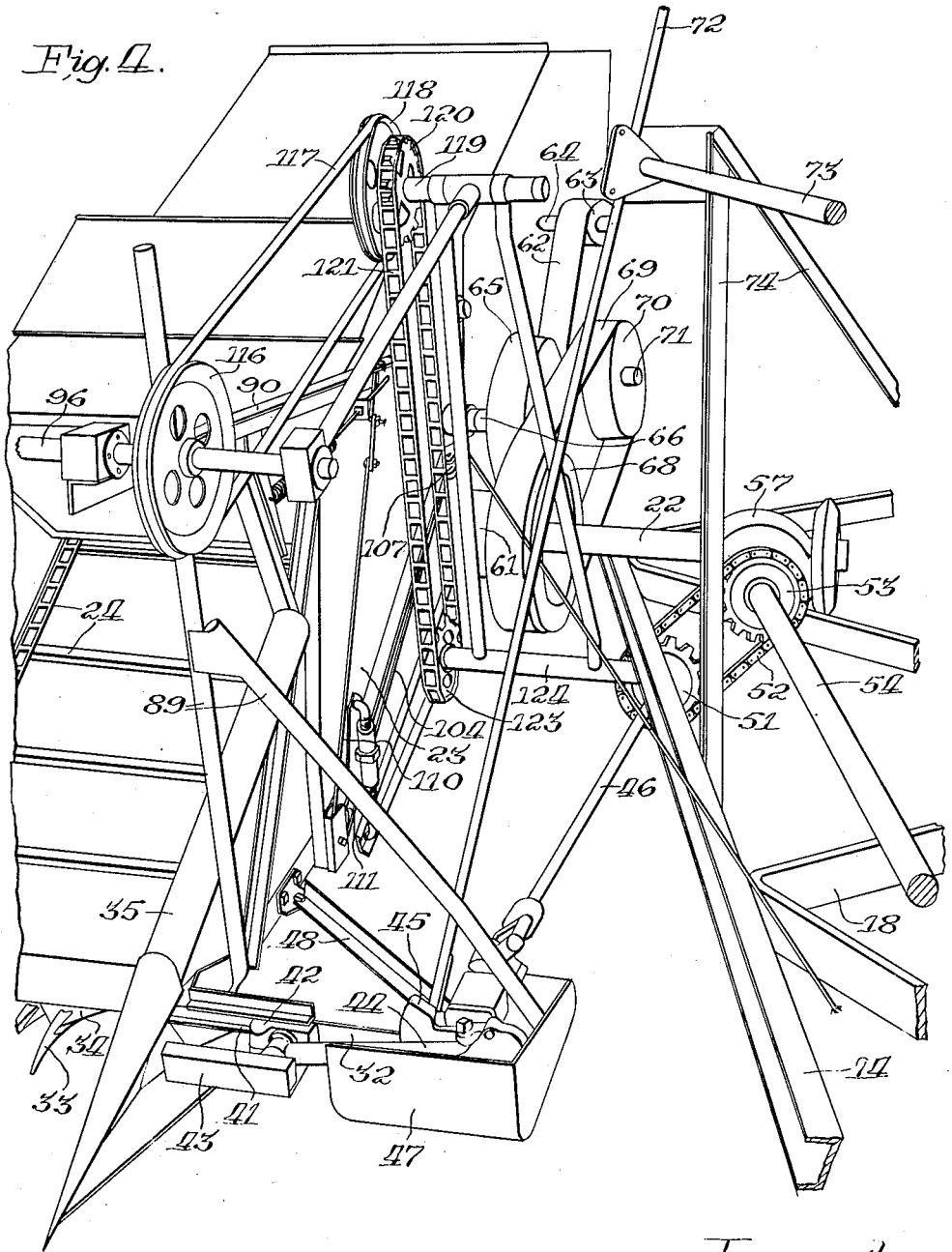

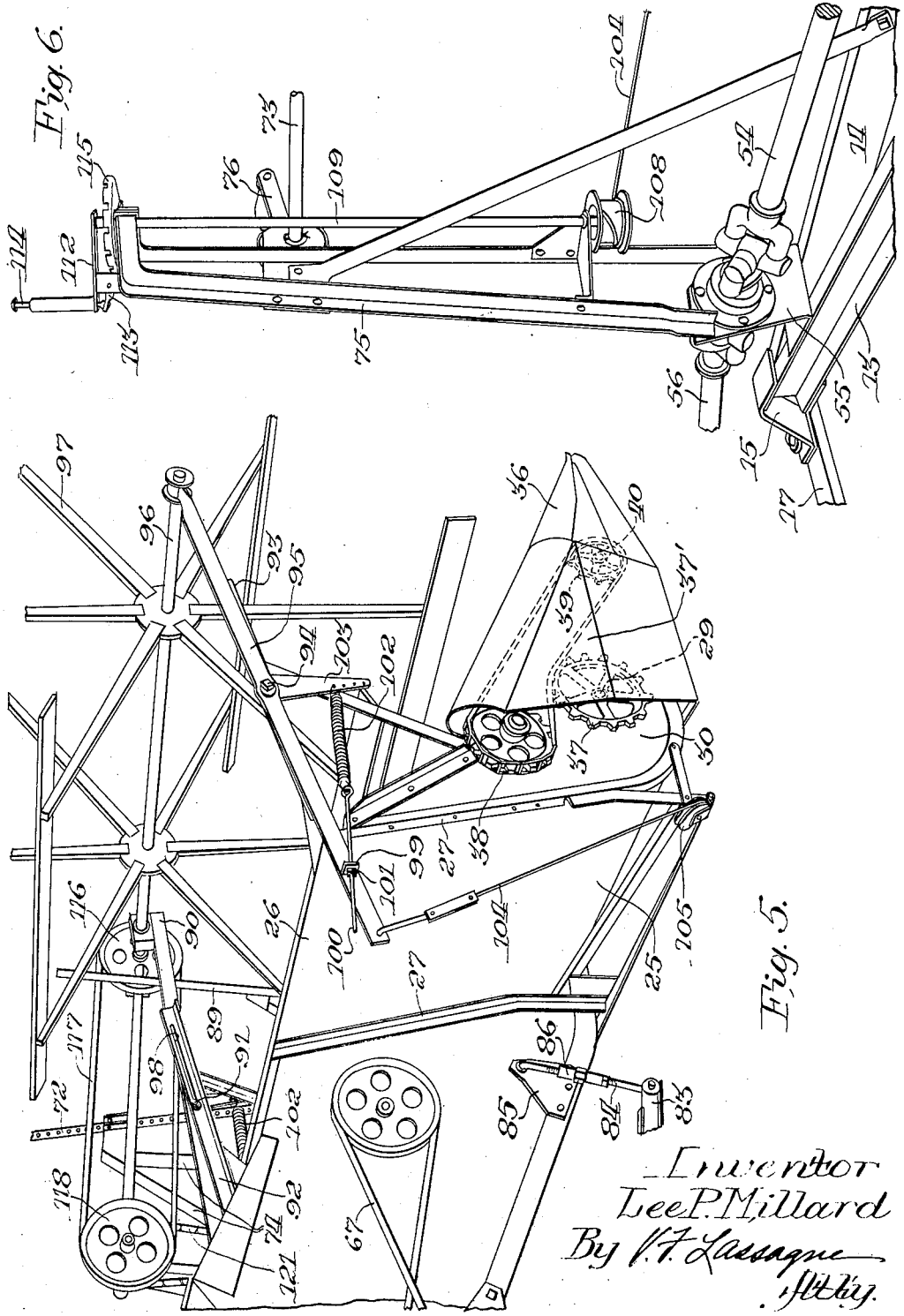

Patented Nov. 8, 1938

2,135,621

UNITED STATES PATENT OFFICE 2,135,621

HARVESTER-THRESHER

Lee P. Millard, Moline, Ill., assignor to International Harvester Company, a corporation of New Jersey Application August 6, 1936, Serial No. 94,607

31 Claims. (Cl. 56—20)

The invention relates to harvester threshers.

Commercial harvester threshers embody a longitudinal thresher part and a transverse harvester part with the latter usually being of a width to cut a relatively wide swath of grain. Machines of such large capacity are relatively large and cumbersome to handle in the field, and are also expensive. The expense and size of such machines are justified where the user has a large acreage to cut and harvest.

It is also desirable that farmers having smaller acreages be given the benefit of the use of harvester threshers in handling their crops, but with such smaller acreage the expense of a large machine is not justified. To make harvester thresher operations available for farmers having smaller acreages, the tendency in the art recently has been to provide harvester threshers of smaller size and capacity, thereby materially reducing the weight thereof, the expense thereof, and the power needed to haul and operate the machine.

This invention, therefore, more particularly relates to the provision of one of these small size or so-called "baby" harvester threshers. The main object of the invention is to provide such a harvester thresher of minimum weight and size and which will have ample capacity for efficiently harvesting and threshing crops in relation to its width of cut.

Another object of the invention is to provide an improved harvester thresher organization and relative location of parts in such organization so that an efficient, inexpensive, easy to handle, small size harvester thresher may be produced.

Another object is to provide such a harvester thresher which may be pulled by a tractor and have its operative mechanisms driven from a shaft included in the harvester thresher and deriving its power from the power take-off shaft on the tractor.

Still another object is to provide an improved reel mounting for the harvester part of the harvester thresher.

It is also an object of the invention to provide an improved and simplified means for adjusting said reel relative to the cutting apparatus of the harvester part.

Another object of the invention in connection with this reel adjustment is to provide such an adjustment that may be controlled from means located in proximity to the seat of the tractor, so that the reel may be adjusted by the operator on the tractor.

Another object is to provide an improved means for raising and lowering the harvester part to accommodate it to the different heights of grain to be cut, this adjustment also including a dual control that may be operated either from an operator's station on the harvester thresher or from the seat on the tractor.

Another object of the invention is to provide an improved and simplified mechanism for driving the operative parts of the harvester thresher, including a novel means in the combination for driving the reel.

Another object of the invention is to provide a simplified means for counterbalancing the weight of the harvester part so that the manual adjustments necessary in raising and lowering the harvester part will be made easy.

Another important object of the invention is to provide a novel counterbalance for the reel so that its adjustment also will be made easy.

Other important objects of the invention will become apparent to those skilled in this art as the disclosure is more fully made.

These desirable objects may be achieved in practice in one form by the illustrative embodiment of the invention shown in the accompanying sheets of drawings wherein there is provided a transverse axle carrying a pair of wheels and between the wheels and on the axle at the stubbleward side of the machine there is provided a longitudinally arranged hitch which is rigid and adapted to be connected at its forward end to the drawbar of a tractor. The rear end of this hitch, along the stubbleward side of the machine, carries a longitudinal operator's deck or station, while the grainward end of the axle carries a longitudinal thresher part, which at its forward end hingedly carries for up and down movement about a horizontal axis a feeder housing. Said feeder housing is included in the harvester part of the machine because it is unified with a transverse harvester platform which extends a short distance grainwardly and laterally of the forward end of the feeder, there being a sickle or knife running across the front edge of the unified platform and feeder for cutting the crop. A reel is mounted in a novel manner over the front end of the feeder housing and the platform is preferably of narrow, transverse length since the machine is of the type not intended to cut a wide swath. The reel cooperates with the knife so that the cut grain falls back onto the platform and onto the feeder, the cut grain falling onto the platform being conveyed by a short auger conveyer transversely in a stubbleward direction and into the feeder for delivery longitudinally rearwardly into the thresher part. Novel driving and counterbalancing mechanisms, as well as control means for the reel and platform, are included in the organization, all as will later more fully appear.

In the drawings,—

Figure 1 is a general plan view of the improved harvester thresher;

Figure 2 is a general side elevational view of a harvester thresher as viewed from its stubbleward side;

Figure 3 is a fragmentary side elevational view, looking from the grainward side of the machine and showing the counterbalance mechanism for the harvester part;

Figure 4 is a fragmentary perspective view, looking from the stubbleward front quarter of the machine and generally showing the organization and driving means included therein;

Figure 5 is a perspective view of the harvester part viewed from the grainward side and looking partly from the rear; and, Figure 6 is an enlarged perspective view of one of the control standards used by the operator from his seat on the tractor for adjusting the harvester part and the reel independently of each other.

The machine embodies a transverse axle 10, carrying a stubbleward supporting wheel 11 and a grainward supporting wheel 12. These wheels are preferably provided with pneumatic tires, as indicated. Carried above the axle in any suitable manner and rigidly associated therewith at the stubbleward side of the machine and between the wheels 11 and 12 is a forwardly extending, rigid hitch composed of a main hitch bar 13 and a diagonal hitch bar 14, which converge at their front end with a clevis 15 adapted, as shown in Figure 2, to be connected to a vertical hinge pin 16 on a draw-bar 17 for a tractor generally indicated in Figure 2. This draw frame 13—14 is suitably cross braced by brace bars 18, as indicated in Figure 1. The rear end of this draw frame 13—14 carries a longitudinally disposed deck 19 constituting an operator's station at the rear end of the draw frame shown in Figure 1, which deck is longitudinally disposed and located between the wheels 11 and 12, as shown at the stubbleward side of the machine. Between the wheels 11 and 12 and spaced grainwardly from the deck 19 and at the grainward side of the axle 10, said axle rigidly carries a longitudinally disposed thresher body 20 enclosing the usual grain separating mechanism which forms no part of this invention and, therefore, is not described. The thresher body 20, as indicated in Figure 3, is carried on the axle 10 by means of a frame structure 21.

At the forward end of the thresher body 20 is arranged a transverse shaft 22 from which is suspended for up and down pivotal movement about the axis of the shaft 22 a forwardly and downwardly extending feeder housing 23 having a tight bottom over which runs an endless conveyer 24 comprising a longitudinally, rearwardly and upwardly extending feeder conveyer. Extending from the forward end of the feeder housing 23 in a transverse, grainward direction is a harvester platform 25 including a backboard 26 and frame elements 27 which are curved at their lower ends, as shown in Figure 5, generally to delineate a trough-shaped bottom pan, over which is disposed an auger conveyer 28 which is carried on a drive shaft 29 mounted in an outer grainward wall 30 enclosing the grainward end of the platform structure 25, as shown in Figure 5. This auger conveyer is of short length and at its stubbleward end terminates adjacent the grainward edge of the feeder conveyer 24, as shown in Figure 1, it being understood that the sole support for the auger conveyer 28 is in the outer end wall 30 and that, therefore, the discharge end of the auger conveyer 28 is left free and unobstructed, so that material conveyed thereby can make a free and uninterrupted right angle turn onto the rearwardly and longitudinally moving feeder conveyer 24 for delivery by it into the thresher body 20 for threshing. The upper end of the feeder housing 23, as it is raised or lowered about the axis of the shaft 22, guides over a stationary hood 31 carried at the front end of the body 20.

The front end of the platform includes a front transverse bar 32 on which are carried the usual guard fingers 33 for a reciprocating knife 34, which knife and guards constitute a cutting apparatus extending across the front of the auger 28 and the feeder 24. Thus, grain cut in advance of the feeder falls directly back onto the feeder, and that cut in advance of the auger falls into the trough 25 and is conveyed by the auger 28 stubblewardly onto the feeder 24. The stubbleward side of the feeder housing carries an inside divider 35 and the grainward end of the platform carries an outside divider 36, which includes a shield 37', as shown in Figure 5, that covers the driving mechanism for the auger shaft 29, which, as shown, comprises a sprocket wheel 39 carried on a transverse shaft 40 which extends underneath the platform along its front edge and also serves at its stubbleward end to carry a conventional roller, not shown, around which operates the feeder conveyer 24, so that the power from the feeder conveyer 24 is utilized through this transverse shaft 40 and chain 38 to drive, as shown in Figure 5, the sprocket wheel 37 and the shaft 29 for turning the auger 28. The knife 34, as shown in Figure 4, is driven from a knife-head 41 operated by a sliding guide 42 in a box 43, said guide including a pitman 44 driven from a flywheel 45 disposed at the front end of a drive shaft 46, the flywheel assembly being shielded by a shoe 47 carried on the platform bar 32 and connected to the stubbleward side of the housing 23 by means of a diagonal bar 48.

The rear end of the shaft 46, as shown in Figure 2, connects with a stub shaft 49 journaled in a bracket 50 located under the draw frame 14, said stub shaft at its rear end carrying a sprocket wheel 51 driven by a chain 52 from a sprocket wheel 53 carried on a line shaft 54. This line shaft is journaled at its front end in a bracket 55 carried at the front end of the draw frame 13—14, as shown in Figure 6, the shaft being adapted to be driven by an extension shaft 56 adapted to be connected to the power take-off shaft of the tractor, not shown, in a manner common in this art. It can thus be seen that the line shaft 54 is driven by take-off power from the tractor itself. The rear end of the shaft 54 is journaled, as shown in Figure 1, in a gear housing 57 and drives a bevel pinion 58, which in turn drives a bevel gear 59 for driving the transverse shaft 22, on which is mounted at the side of the housing of the body 20 a pulley 61 for driving a belt 62, which at its rear end drives a pulley 63 on a shaft 64 entering the housing 20 to drive any suitable thresher mechanism therein. The side of the housing 20 carries a large pulley 65 driven from the belt 62 for driving a transverse shaft 66, entering the body 20, and coming out of the grainward side thereof, as shown in Figure 1, to drive by means of a belt and pulley arrangement 67 any suitable interior parts of the thresher and feeder mechanism in advance thereof, as may be desired. The shaft 60 also drives, as shown in Figure 4, a large pulley 68 for driving a belt 69 to drive a pulley 70 and transverse shaft 71, said shaft 71 carrying a threshing cylinder, not shown, inside the body 20.

The harvester part, composed of the platform 25 and feeder housing 23, is a unitary structure in that it may be adjusted up or down about the axis of the shaft 22. The adjustment is accomplished by means of an upright rack bar 72, the upper end of which, as shown in Figure 2, is formed of a series of holes adapted to cooperate with a conventional rack wheel, not shown, and carried at the rear end of a shaft 73 disposed horizontally and journaled in a frame structure 74 supported from the draw frame 13—14. The front end of the shaft 73, as shown best in Figures 2 and 6, is carried in a suitable standard 75, the front end of said shaft 73 carrying a detachable crank 76 used in turning the shaft 73. Any suitable form of releasable latch may be associated with the mechanism described to hold the shaft 73 against turning when the rack bar 72 has been moved to the desired position for adjusting the harvester part. Said crank 76, as shown in Figure 2, is in a position accessible to the operator on his seat on the tractor. If it is desired to operate the shaft 73 and rack bar 72 from the operator's deck 19 at the rear end of the draw frame 13—14, then said crank 76 may be detached from the front end of the shaft 73 and be located at the rear end thereof where it will be accessible to the operator on the deck 19.

Since the harvester part is too heavy to be conveniently raised or lowered by manually applied power as just described, there is provided a counterbalancing spring mechanism to equalize the weight of the harvester part and make its up and down adjustment by the manually operated means described easy. As shown in Figures 2 and 3, the forward portion of the frame 21 underneath the thresher body 20 carries a journal 77 for the transversely disposed rock-shaft 78 carried just below the axis 22, about which the harvester part is adjusted, the axis of the shaft 22 and of the shaft 78 being both horizontally and transversely disposed in parallelism. Securely anchored to the grainward end of the shaft 78 is a cam lever 79, to which is anchored a chain 80 in turn connected to a heavy, rearwardly extending counterbalance spring 81, which is anchored at 82 to the rear end of the frame 21 at a point considerably rearwardly of the machine axle 10. The grainward end of the rock-shaft 78 also carries, rigidly connected thereto, a forwardly extending crank arm 83 carrying at its free end a rod 84 connected securely by means of a bracket 85 to the grainward side of the feeder housing 23, said member 84 including a turnbuckle 86, so that it may be lengthened or shortened between the end of the crank arm 83 and its connection to the housing 23, whereby undesirable sag in the harvester part may be taken out. The stubbleward end of the rock-shaft 78 carries another forwardly extending crank arm 87 at all times parallel with the arm 83 and being similarly connected to the stubbleward side of the feeder housing 23 by an adjustable rod 88. It can be seen that the spring 81 exerts a force through the structure thus described for counterbalancing the weight of the harvester part.

A reel is adjustably supported over the platform and feeder and driven in a novel manner, and such mechanism will next be described. In Figure 4 it will be seen that the shoe 47 and the stubbleward side of the housing 23 carry an upright supporting frame structure 89 for supporting the front end of a forwardly extending angle bar 90, which has its intermediate portion pivotally mounted at 91 on a frame 92 rigidly carried on the stubbleward side of the housing 23. Similarly, as shown in Figure 5, the grainward end of the platform frame structure 27 carries a rigid, forwardly extending beam 93 providing a pivot 94 in transverse alignment with the pivot 91 for carrying a rocking bar 95. The bars 90 and 95 at their front ends carry a transverse reel shaft 96, on which is supported a reel 97 extending over the cutting apparatus 34, as shown in Figure 1, and cooperating therewith in the usual manner. As shown in Figure 5, each bar 92—93 is provided with a slot 98, so that relative sliding motion may take place between the bars 90—95, respectively, and the supporting beams 92—93, respectively.

Adjacent the rear end of each beam 90—95 is carried an apertured guide block 99, through which is passed a rod 100 carrying a stop nut 101 on the back side of the bracket 99, said rod on each beam extending through its bracket 99 and carrying a counterbalance spring 102 which may be adjustably connected in any one of a number of holes provided in a lever arm 103, respectively carrying the bolts or pivots 91—94 in the slots 98 in the supports 92—93. The spring 102 on each side of the reel supports serves to counterbalance the weight of the reel to make adjustment thereof easy.

Each reel supporting beam 95 extends rearwardly a distance and the beam 95 has connected to its rear end a cable 104, which is trained around a pulley wheel 105 to cause the cable 104 to run transversely, so that it might be trained around a pulley 106, shown in Figure 1, said cable then having its direction changed rearwardly and upwardly to go around pulley 107 with the cable, as shown in Figures 1 and 6, extending forwardly to be dead-ended to and connected to a windlass 108 at the lower end of a vertical shaft 109 suitably journaled in the standard 75 heretofore described. The stubbleward reel supporting beam 90 at its rear end carries a branch cable 110 extending forwardly around a sheave 111 and back to be merged into the single run of the cable 104. At the upper end of the shaft 109 is a crank handle 112 for turning the shaft 109, said handle carrying a detent or releasable latch 113 operated by a hand button 114 included in the handle 112, so that the shaft 109 may be locked in any angular position by means of a horizontal circular notched sector plate 115. When the hand wheel 112 is released and turned to rotate the shaft 109, of course, the windlass turns to pull on the cable 104 and its branch 110, so that both beams 90 and 95 are simultaneously swung together in parallelism to raise or lower the wheel.

The reel is driven by means of a grooved pulley 116, as shown in Figure 4, carried on the reel shaft 96, said pulley wheel being driven from a belt 117 and a grooved pulley wheel 118 on a transverse shaft 119, which carries a sprocket wheel 120 driven from a chain 121 and a sprocket wheel 123 on a lower transverse shaft 124, which, as shown in Figure 1, extends transversely in a stubbleward direction underneath the platform or deck 19, to be driven, as also shown in Figure 2, from a sprocket wheel 125 and a chain 126, which derives its power from a sprocket wheel 127 concentric with the axle 10 of the machine and turning with the stubbleward ground wheel 11. Thus, the reel is driven from a ground wheel independently of the power take-off shaft, so that the speed of rotation of the reel is in direct proportion to the rate of travel of the machine over the ground. The mode of operation and use of the harvester thresher of this invention will next be described.

The improved harvester thresher will have its rigid draw frame 13—14, through the medium of the clevis 15, attached to the draw-bar 17 of a tractor with said draw-bar holding the draw frame supported off the ground. As the machine moves along, the propeller shaft 54, which is being driven from the power take-off shaft on the tractor, drives the operative mechanisms in the thresher part and the harvester part, as has been described, with the exception of the reel 97, which is driven by power transmitted through the chain 124 from the stubbleward supporting wheel 11. The knife 34 cuts the standing grain and the reel 97, in the usual way, moves the cut grain back onto the trough platform 25 where the auger conveyer 28 receives the same and moves it laterally in a stubbleward direction onto the feeder 24. That grain cut by the knife in front of the feeder 24 falls directly back onto the feeder and is moved backwardly thereby along with the grain coming from the auger 28 to be fed rearwardly through the feeder housing 23 and into the threshing mechanism contained within the housing 20.

The harvester part, composed of the platform 25 and feeder housing 23, may be raised and lowered as a unit for adjusting the height of cut by means of the rack-bar 72, which is raised or lowered through the medium of the shaft 73 and the detachable handle 76 which may be operated by the operator from his seat on the tractor when the same is located at the front end of said shaft 73, or which may be operated from the rear end of said shaft 73 by an operator on the platform 19 when the handle 76 is located at the rear end of said shaft 73. The harvester part in said raising and lowering movements swings about the transverse horizontal axis of the shaft 22. The counterbalancing spring 81 serves, through the shaft 78 and its arms 79, 83 and 87, to spring the weight of said harvester part, so that the manual adjustments thereof will be facilitated.

The reel is adjusted up or down by means of the cable 104, which may be operated by rotating the shaft 109 and the controller handle 112. The location of the pulley 107 for this cable 104 is such that it is substantially coincident with the axis 22, so that raising and lowering movement of the harvester part in no way can disturb the relative location of the reel with respect to the harvester part. The handle 76 may be transferred to the rear end of the shaft 73, so that an operator on the deck 19 may raise and lower the harvester from said rear station.

The hitch 13—14 is triangular in plan with its base substantially at the axle 10, said hitch at its rear end being wider than the width of the thresher body, thereby providing within the wheel tread of the machine a large area on the hitch frame for supporting some suitable harvester thresher auxiliary, such for example as the platform or deck 19, or a tank, or a bagging attachment.

It will be seen from this detailed description that an improved, small size, light weight harvester thresher has been provided, which achieves all of the desirable objects heretofore recited, and that the same is of a construction adapting it for commercial manufacture.

It is the intention to cover all changes and modifications of the illustrative example of the invention disclosed which do not depart from the spirit and scope of the invention as defined in the appended claims.

What is claimed is:

1. In a harvester thresher, a transverse axle supported at its ends by wheels, a hitch frame for drawing the harvester thresher arranged longitudinally and disposed at the stubbleward end of the axle, an operator's deck carried on the hitch frame over the axle, a thresher part disposed over and carried by the axle and extending longitudinally at the grainward end of the axle adjacent the said deck, and a harvester part suspended from the forward end of the thresher part and disposed grainwardly of the hitch frame.

2. In a harvester thresher, a transverse axle supported at its ends by wheels, a hitch frame for drawing the harvester thresher arranged longitudinally and disposed at the stubbleward side of the harvester thresher and connected rigidly to the stubbleward end of the axle, an operator's deck carried on the hitch frame over the axle at said side of the harvester thresher, a longitudinally extending thresher part disposed over the axle and carried on the grainward end thereof adjacent the said deck, and a harvester part suspended from the forward end of the thresher part and disposed grainwardly of the hitch frame, said thresher part and deck lying between said wheels.

3. In a harvester thresher, a transverse axle supported at its ends by wheels, a hitch frame for drawing the harvester thresher arranged longitudinally and disposed at the stubbleward side of the harvester thresher, an operator's deck carried on the hitch frame over the axle at said side of the harvester thresher, and a thresher part carried on the axle and extending longitudinally at the grainward side of the axle and adjacent the said deck, said thresher part and deck being located between said wheels.

4. In a harvester thresher, a transverse axle supported at its ends by wheels, a hitch frame for drawing the harvester thresher arranged longitudinally and disposed at the stubbleward side of the harvester thresher and extending forwardly of and connected to the axle, a thresher part disposed over the axle and extending longitudinally over the grainward side of the axle and offset grainwardly from said hitch frame, and a harvester part suspended from the forward end of the thresher part and also disposed grainwardly of the hitch frame.

5. In a harvester thresher, a transverse axle supported at its ends by wheels, a hitch frame for drawing the harvester thresher arranged longitudinally and disposed at the stubbleward side of the harvester thresher, an operator's deck carried on the hitch frame over the axle at said side of the harvester thresher, a thresher part disposed over the axle and extending longitudinally at the grainward end of the axle and adjacent the said deck, and a harvester part suspended from the forward end of the thresher part and disposed grainwardly of the hitch frame, said harvester part including a platform extending transversely in front of the grainward wheel to a point outside the wheel in a grainward direction, and said thresher part and deck being located inside the wheels.

6. In a harvester thresher, a transverse axle supported at its ends by wheels, a hitch frame for drawing the harvester thresher arranged longitudinally and disposed at the stubbleward side of the harvester thresher, a thresher part disposed over the axle and extending longitudinally and carried on the axle along the grainward end thereof, a harvester part suspended from the forward end of the thresher part and disposed grainwardly of the hitch frame for up and down movement about a transverse horizontal axis, means to raise and lower the harvester part, a rockshaft disposed transversely under the harvester part including connections for supporting the harvester part, and a spring pulled crank rockable with said shaft.

7. In a harvester thresher, a transverse axle supported at its ends by wheels, a thresher part disposed over the axle and extending longitudinally, a harvester part suspended from the forward end of the thresher part and disposed for up and down movement about a transverse horizontal axis, a transverse rockshaft located below the harvester part, a crank movable with the shaft and connected with the harvester part, and a counterbalance spring for the harvester part connected between the shaft and thresher part.

8. In a harvester thresher, a transverse axle supported at its ends by wheels, a thresher part disposed over the axle and extending longitudinally, a longitudinal feeder housing suspended from the forward end of the thresher part in advance thereof for up and down movement about a transverse horizontal axis and including a transverse harvester platform, a transverse rockshaft located under the feeder housing, a crank on the shaft and rockable therewith and including a spring connected thereto and to the thresher part, and forwardly extending crank arms movable with the shaft and respectively located at each end thereof and each arm including a link connected to the respective side of the feeder housing for carrying the feeder housing.

9. In a harvester thresher, a transverse axle supported at its ends by wheels, a thresher part disposed over the axle and extending longitudinally, a longitudinal feeder housing suspended from the forward end of thresher part in advance thereof for up and down movement about a tranverse horizontal axis and including a transverse harvester platform, a transverse rockshaft located under the feeder housing, a crank on the shaft and rockable therewith and including a spring connected thereto and to the thresher part, and forwardly extending crank arms movable with the shaft and respectively located at each end thereof and each arm including a link connected to the respective side of the feeder housing for carrying the feeder housing, said links including means for relatively positioning the feeder housing in relation to the links for leveling the feeder housing and platform.

10. In a harvester thresher, a transverse axle carried in a wheel at each end thereof, a longitudinal thresher body carried on the grainward end of the axle, a hitch frame at the stubbleward end of the axle and extending forwardly therefrom, a substantially longitudinal shaft carried on the hitch frame, a harvester part suspended from the forward end of the thresher and movable up and down about a transverse horizontal axis, a bar connected between the harvester part and shaft, and means for turning the shaft to move the bar for raising and lowering the harvester part.

11. In a harvester thresher, a transverse axle carried in a wheel at each end thereof, a longitudinal thresher body carried on the grainward end of the axle, a hitch frame at the stubbleward end of the axle and extending forwardly therefrom, an operator's deck mounted on the axle at the rear end of the hitch frame, a substantially longitudinal shaft carried on the hitch frame, said shaft extending substantially the length of the hitch frame from its forward end to the front end of the deck, a harvester part suspended from the forward portion of the thresher part and movable up and down about a transverse horizontal axis, a connection between the shaft and harvester part to raise or lower the latter when the shaft is turned, and means for turning the shaft.

12. In a harvester thresher having an adjustable harvester part, an independently adjustable reel, and a draw frame for pulling the harvester thresher, the combination with the frame of a standard thereon, control means on the standard including connections for adjusting the harvester part, and independent control on the standard including connections for adjusting the reel.

13. In a harvester thresher having an adjustable harvester part, an independently adjustable reel, and a draw frame for pulling the harvester thresher, the combination with the frame of a standard thereon, and individually operable manual control means carried on the standard for adjusting the harvester part and reel.

14. In a harvester thresher having an adjustable harvester part, an independently adjustable reel, and a draw frame for pulling the harvester thresher, the combination with the frame of a standard thereon, a rockshaft carried on the standard including connections to adjust the harvester part, a rotatable shaft including a windlass and cable connected with the reel for adjusting the latter, and separate means for manually and individually operating said shafts.

15. In a harvester thresher having an adjustable harvester part, an independently adjustable reel, power driven parts, and a draw frame for pulling the harvester thresher, the combination with said frame of a standard thereon, a propeller shaft journaled on the standard adapted to deliver power from a tractor to said driven parts, control means carried on the standard including connections for adjusting the harvester part, and other control means carried on the standard including connections for adjusting the reel.

16. In a harvester thresher, a longitudinal thresher part, a harvester part disposed forwardly thereof and carried for up and down pivotal movement about a transverse horizontal axis, a reel including a reel frame for supporting the reel for up and down movement over the harvester part, a draw-frame included in the harvester thresher, a windlass carried on said draw frame, a sheave mounted in close proximity to the axis about which the harvester part moves, a cable connected between the windlass and reel frame and trained around said sheave, and means for operating the windlass to adjust the reel.

17. In a harvester thresher, a longitudinal thresher part, a harvester part disposed forwardly thereof and carried for up and down pivotal movement about a transverse horizontal axis, a reel including a reel frame for supporting the reel for up and down movement over the harvester part, a draw frame included in the harvester thresher, a windlass carried on said draw frame, a sheave mounted in close proximity to the axis about which the harvester part moves, a cable connected between the windlass and reel frame and trained around said sheave, and means for operating the windlass to adjust the reel, said cable between the sheave and reel being bifurcated with one branch anchored to one side of the reel frame and the other branch anchored to the opposite side of said reel frame.

18. In a harvester thresher, a longitudinal thresher part, a harvester part disposed forwardly thereof and carried for up and down pivotal movement about a transverse horizontal axis, a reel including a reel frame for supporting the reel for up and down movement over the harvester part, a draw frame included in the harvester thresher, a windlass carried on said draw frame, a sheave mounted in close proximity to the axis about which the harvester part moves, a cable connected between the windlass and reel frame and trained around said sheave, and means for operating the windlass to adjust the reel, said reel frame including relatively movable supports, and a counterbalance spring operatively associated with said supports for springing the weight of the reel.

19. In a harvester thresher, a transverse axle carried at its ends in wheels, a longitudinal thresher part mounted on the axle along its grainward end, a draw frame including an operator's deck at the stubbleward end of the axle, a harvester part suspended from the forward portion of the thresher part, a reel carried for rotation over the harvester part, a transverse shaft driven from the stubbleward wheel and disposed under the draw frame, and means to drive the reel from said shaft.

20. A harvester thresher comprising a transverse axle, a longitudinal thresher body carried on the grainward end of said axle, a draw frame connected with said body and disposed stubblewardly of the body and extending forwardly alongside thereof from the stubbleward end of the axle, a wheel supporting the axle at each end thereof with the wheels spaced apart a greater distance than the combined width of the body and draw frame, said draw frame being triangular with its base substantially along the axle and at said base being at least as wide as the width of the thresher body thereby providing a relatively large space inside the wheels for mounting a suitable auxiliary for use with the harvester thresher.

21. In a harvester thresher, a transverse axle supported by a wheel at each end, a longitudinal thresher part rigidly carried on the axle adjacent the grainward end thereof, a harvester part adjustably connected to and carried from the front end of the thresher part in advance thereof, a rigid tractor hitch frame connected to the stubbleward end of the axle and extending longitudinally forwardly, a reel carried on the harvester part for independent adjustment, and means on the hitch frame for independently adjusting the harvester part and reel.

22. In a two wheel supported harvester thresher, a transverse axle carried by a wheel at each end, a longitudinal thresher part carried rigidly on the axle and over the grainward end thereof inside the grainward wheel and extending ahead of said axle, a harvester part hingedly hung from the forward end of the thresher part, a rigid hitch frame connected to and extending forwardly from the axle between the stubbleward wheel and the thresher part, control means on the hitch frame for hinging the harvester part, and means to counterbalance the weight of the harvester part.

23. In a two wheel supported harvester thresher, a transverse axle carried by a wheel at each end, a longitudinal thresher part carried rigidly on the axle and over the grainward end thereof inside the grainward wheel and extending ahead of said axle, a harvester part hingedly hung from the forward end of the thresher part, a rigid hitch frame connected to and extending forwardly from the axle between the stubbleward wheel and the thresher part, a power shaft carried on the hitch frame and adapted to be driven from a tractor to which the hitch frame is adapted to be connected, operative mechanism included in the thresher part, means for driving said mechanism from the said shaft, and control means on the hitch frame accessible to an operator on the tractor to adjust the harvester part.

24. In a harvester thresher, a transverse axle carried in a wheel at each end thereof, a longitudinal thresher part rigidly carried on the grainward end of the axle, a hitch frame connected to the stubbleward end of the axle and extending forwardly therefrom, a harvester part carried from the front end of the thresher part and including a reel mounted for adjustment in relation to the harvester part, said hitch frame adapted for direct connection to a tractor, said thresher and harvester parts having operative mechanisms, means on the hitch frame for driving said mechanisms, and means on the hitch frame for adjusting the reel.

25. In a two wheel supported harvester thresher, a transverse axle carried by a wheel at each end, a longitudinal thresher part carried rigidly on the axle and over the grainward end thereof inside the grainward wheel and extending ahead of said axle, a harvester part hingedly hung from the forward end of the thresher part, a rigid hitch frame connected to and extending forwardly from the axle between the stubbleward wheel and the thresher part, a reel carried for rotation over the harvester part, and means operable by the stubbleward wheel for driving said reel.

26. In a two wheel harvester thresher comprising a transverse axle carried in a wheel at each end, a rigid hitch connected to the axle along its stubbleward end, a thresher body mounted on the axle at its grainward end, said hitch and body extending forwardly of the axle and together substantially occupying the space between said two wheels, a harvester adjustably hung from the front end of the body, and means on the forward end of the hitch including connections for adjusting the harvester.

27. In a two wheel harvester thresher comprising a transverse axle carried in a wheel at each end, a rigid hitch connected to the axle along its stubbleward end, a thresher body mounted on the axle at its grainward end, said hitch and body extending forwardly of the axle and together substantially occupying the space between said two wheels, and an auxiliary adapted to be carried over the axle and to occupy the space adjacent and above the rear end of the hitch between the body and stubbleward wheel.

28. In a two wheel harvester thresher comprising a transverse axle carried in a wheel at each end, a rigid hitch connected to the axle along its stubbleward end, a thresher body mounted on the axle at its grainward end, said hitch and body extending forwardly of the axle and together substantially occupying the space between said two wheels, said hitch adapted to be connected to a tractor and carrying a power shaft adapted to be tractor-driven, a harvester carried at the front end of the body including a rotatable reel, said body and harvester including operative mechanisms all of which except the reel are driven from said power shaft, and means for driving the reel independently from one of said wheels.

29. In a harvester thresher, a transverse axle supported by a wheel at each end, a longitudinal thresher part rigidly supported on the axle, a rigid hitch connected to the axle at the stubbleward side of the thresher part, both the thresher part and hitch being inside the wheels with the hitch adapted for direct connection and sole support from a tractor draw bar, a harvester part hingedly connected to and carried from the front end of the thresher part in advance thereof and comprising a transverse knife and a rearwardly and upwardly inclined conveyer for feeding material from the knife to the thresher part, and control means mounted on the forward end of the hitch in a position accessible to an operator on the tractor for adjusting the harvester part hingedly.

30. In a harvester thresher, a transverse axle supported by a wheel at each end, a longitudinal thresher part rigidly supported on the axle, a rigid hitch connected to the axle at the stubbleward side of the thresher part, both the thresher part and hitch being inside the wheels with the hitch adapted for direct connection and sole support from a tractor draw bar, a harvester part hingedly connected to and carried from the front end of the thresher part in advance thereof and comprising a transverse knife and a rearwardly and upwardly inclined conveyer for feeding material from the knife to the thresher part, a reel operatively associated with the knife and adjustably mounted, and control means mounted on the hitch in a position accessible to an operator on the tractor for adjusting the harvester part and reel.

31. In a harvester thresher, a transverse axle supported by a wheel at each end, a longitudinal thresher part rigidly supported on the axle, a rigid hitch connected to the axle at the stubbleward side of the thresher part, both the thresher part and hitch being inside the wheels with the hitch adapted for direct connection and sole support from a tractor draw bar, a harvester part hingedly connected to and carried from the front end of the thresher part in advance thereof and comprising a transverse knife and a rearwardly and upwardly inclined conveyer for feeding material from the knife to the thresher part, and a transversely disposed operative auger conveyer included in the harvester part and cooperative with the inclined conveyer for feeding cut material from the knife to the thresher part.

LEE P. MILLARD.